(12) United States Patent
Sterian

(10) Patent No.: US 7,385,182 B2
(45) Date of Patent: Jun. 10, 2008

(54) TEMPERATURE SENSING CIRCUIT HAVING A CONTROLLER FOR MEASURING A LENGTH OF CHARGING TIME

(75) Inventor: Andrew Sterian, Grandville, MI (US)

(73) Assignee: Nicholas Plastics Incorporated, Allendale, MI (US)

( * ) Notice: Subject to any disclaimer, the term of this patent is extended or adjusted under 35 U.S.C. 154(b) by 0 days.

(21) Appl. No.: 11/500,006

(22) Filed: Aug. 7, 2006

(65) Prior Publication Data
US 2007/0034791 A1 Feb. 15, 2007

Related U.S. Application Data

(60) Provisional application No. 60/706,075, filed on Aug. 5, 2005.

(51) Int. Cl.
*H01J 40/14* (2006.01)
(52) U.S. Cl. .................................... 250/238; 250/214 R
(58) Field of Classification Search ................ 250/238, 250/214 R, 214.1, 214 A, 227.14; 327/514, 327/493, 503, 586; 257/80–85
See application file for complete search history.

(56) References Cited

U.S. PATENT DOCUMENTS

| 3,911,298 | A | * | 10/1975 | Borsdorf et al. ............. 310/318 |
| 4,916,307 | A | | 4/1990 | Nishibe et al. |
| 5,650,643 | A | | 7/1997 | Kunoma |
| 6,359,274 | B1 | | 3/2002 | Nixon et al. |
| 6,918,674 | B2 | | 7/2005 | Drummond et al. |

* cited by examiner

Primary Examiner—Que T Le
(74) Attorney, Agent, or Firm—Price, Heneveld, Cooper, DeWitt & Litton, LLP

(57) ABSTRACT

A temperature sensor includes a photodiode or other suitable light-sensitive device connected to a power source in a reverse bias configuration. A capacitor and a controller are connected to the photodiode. The controller measures the length of time required for the capacitor to charge to a predetermined voltage, and the known relationship between the dark current of the photodiode and the temperature is utilized to determine temperature. The controller resets the capacitor to zero volts, and repeats the charge/time measurement cycle.

3 Claims, 2 Drawing Sheets

TEMPERATURE SENSING CIRCUIT HAVING A CONTROLLER FOR MEASURING A LENGTH OF CHARGING TIME

CROSS-REFERENCE TO RELATED APPLICATIONS

This application claims the benefit of U.S. Provisional Application No. 60/706,075, filed Aug. 5, 2005, the entire contents of which is hereby incorporated by reference.

BACKGROUND OF THE INVENTION

Fiber optic circuits generally include a transmitter such as a laser that converts an electrical signal (electrical energy) into a light signal (light energy) and injects the light into an optical fiber. A receiver coupled to the optical fiber converts the light energy into electrical energy after the light signal is transmitted through the optical fiber. A photodiode is one type of semiconductor device that converts light energy into electrical energy. A photodiode may be placed in a reverse bias configuration in which an external voltage potential keeps the photodiode cathode at a higher potential than the photodiode anode. The photodiode substantially blocks the flow of current when under reverse bias. However, a small amount of leakage current may flow from the cathode to the anode.

The photodiode leakage current when under reverse bias can increase due to several factors. First, when light shines on the photodiode, the leakage current increases significantly. FIG. 2 shows the reverse current as a function of optical power for an Optek OP950 photodiode. Increases in optical power lead to proportional increases in leakage current. Second, when no light shines on the photodiode, the leakage current ("dark current" in this case since there is no light) changes greatly with temperature (FIG. 3). FIG. 3 shows the variation of both light current and dark current with temperature for an Optek OP950 photodiode. The light current varies by less than ±10% over the temperature range −40° C. to +100° C. However, the dark current over the same temperature range varies from 1/400 to 1000 times the dark current at room temperature (five orders of magnitude). Thus, relatively small changes in temperature cause relatively large changes in dark current.

SUMMARY OF THE INVENTION

One aspect of the present invention is an electrical circuit for modifying the electrical power delivered to a fiber optic active emitter device depending upon ambient temperature. The circuit allows the active emitter device to reduce its power dissipation at high temperatures, thereby ensuring that the active emitter device stays within its thermal safe operating area. Another aspect of the present invention is that the circuit uses a fiber optic receiver device as both an optical sensor and temperature measuring device, thereby minimizing total system costs, complexity, and part count. The circuit according to one aspect of the invention includes a photodiode D1 (FIG. 1), light-emitting diode (OED) D2, capacitor C1, voltage source V1, microcontroller, and LED driver circuitry. The photodiode D1 and light-emitting diode D2 are connected to optical fibers. Additional circuitry and wiring (not shown) of a known configuration may be utilized to provide proper operation of the microcontroller.

These and other features, advantages, and objects of the present invention will be further understood and appreciated by those skilled in the art by reference to the following specification, claims, and appended drawings.

DETAILED DESCRIPTION OF PREFERRED EMBODIMENT

The present application is related to U.S. patent application Ser. No. 11/500,016, entitled LIGHT INTENSITY SENSOR FOR OPTICAL FIBERS, filed on even date herewith, the entire contents of which are incorporated by reference.

Figure 1:
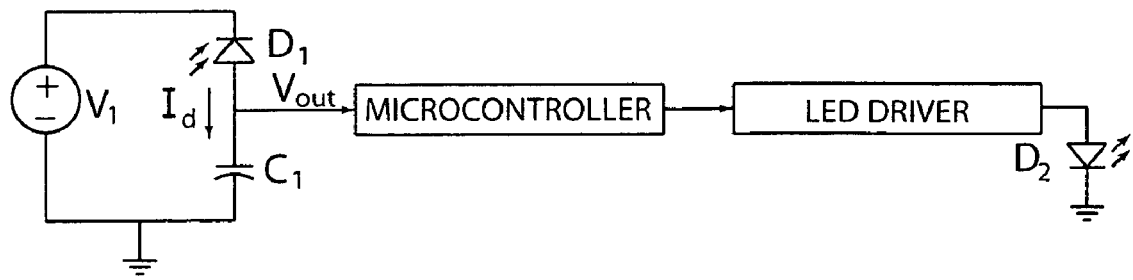
FIG. 1 is a partially schematic drawing of a circuit for modifying optical power emission depending on ambient temperature according to one aspect of the present invention.
Figure 2:
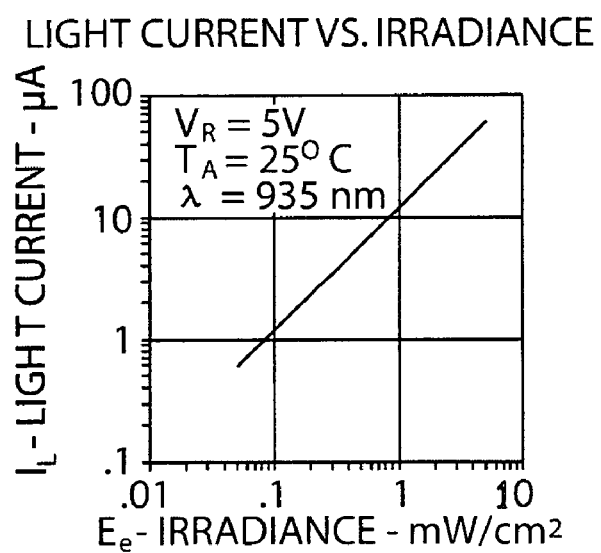
FIG. 2 shows the variation of light current against optical power for an Optek OP950 photodiode.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
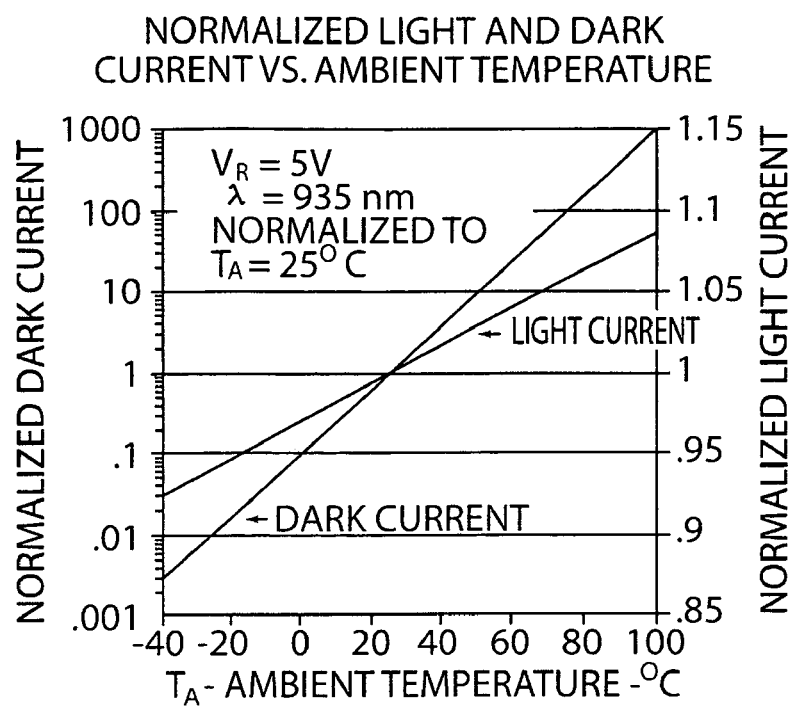
FIG. 3 shows the variation of light current and dark current against temperature for the Optek OP950 photodiode.

FIG. 3 shows the variation of both light current and dark current with temperature for an Optek OP950 photodiode. The light current varies by less than ±10% over the temperature range −40° C. to +100° C. However, the dark current over the same temperature range varies from 1/400 to 1000 times the dark current at room temperature (five orders of magnitude). Thus, small changes in temperature cause relatively large changes in dark current. As discussed in more detail below, the strong variation of dark current with temperature permits a circuit according to one aspect of the present invention (FIG. 1) to indirectly measure ambient temperature.

With reference to FIG. 1, the photodiode leakage current is used to charge capacitor C1. The current flowing into a capacitor $i_c(t)$ is related to the voltage across the capacitor $v_c(t)$ and the capacitance $C_1$ according to:

$$i_c(t) = C - 1 \frac{dv_c(t)}{dt}$$

Assuming that the capacitor begins with no charge such that $v_c(0)=0$, then if a constant photodiode leakage current flows into the capacitor, $I_d = i_c(t)$, the capacitor voltage will be:

$$dv_c(t) = \frac{1}{C_1} i_c(t) dt$$

$$\int_0^\tau dv_c(t) = \frac{1}{C_1} \int_0^\tau i_c(t) dt$$

$$v_c(\tau) - v_c(0) = \frac{1}{C_1} \int_0^\tau I_c dt$$

$$v_c(\tau) = \frac{I_d \tau}{C_1}$$

or, rewriting in terms of the time variable t:

$$v_c(t) = \frac{I_d t}{C_1}$$

Thus, the voltage across the capacitor $v_c(t)$ increases linearly with time, and in proportion to the photodiode current $I_d$ and inversely with capacitance $C_1$.

The capacitor $C_1$ (FIG. 1) is initially discharged such that the potential at node $V_{out}$ is 0V (or "ground"). The photodiode $D_1$ converts light energy into an electrical current $I_d$. The current charges the capacitor $C_1$ and increases the voltage at the node $V_{out}$ according to $$V_{out} = \frac{I_d t}{C_1}$$

The microcontroller senses this voltage and measures the time it takes for the voltage to reach a predetermined voltage level $V_T$. The length of time to reach $V_T$ depends on both light energy and the temperature of the photodiode. When there is no light irradiating the photodiode, the time it takes for $V_{out}$ to reach a predetermined voltage level $V_T$ depends only on temperature. Thus, the longer it takes for $V_{Out}$ to reach the specified voltage level $V_T$, the lower the temperature.

After the microcontroller has detected that $V_{out}$ has reached $V_T$, the microcontroller then discharges the capacitor using the same pin that was used for sensing $V_{out}$. That is, the pin changes direction from being an input signal to the microcontroller to become an output signal that is set to 0 volts. The effect of this action is to set $V_{out}$ to 0 and allow for another capacitor charging process to being. In this fashion, consecutive repeated measurements are taken.

Figure 4:
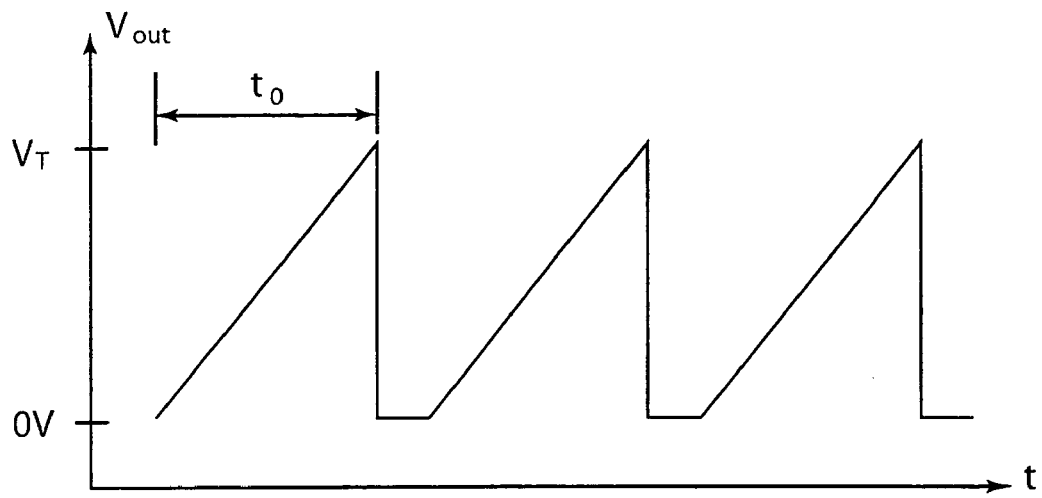
FIG. 4 shows the time-domain behavior of the circuit of FIG. 1.

The time-domain behavior of the circuit of FIG. 1 is illustrated in FIG. 4. At a nominal temperature, the capacitor voltage $V_{out}$ take $t_0$ seconds to charge from 0 volts to $V_T$ volts. After this time, the microcontroller forces the signal $V_{out}$ to 0 volts. After a short duration during which the capacitor is allowed to discharge, the microcontroller stops forcing the voltage at $V_{out}$ to 0 volts and allows the photodiode to charge the capacitor again. When the temperature is reduced, the capacitor charges more slowly (due to the reduced current $I_d$) and it now takes longer to charge the capacitor from 0 volts to $V_T$ volts. The microcontroller uses this change in time to sense changes in photodiode current $I_d$. Since photodiode current Id in the absence of light (i.e., dark current) depends on temperature, the microcontroller can use the estimate of charging time $t_0$ as a measurement of ambient temperature. By communicating with the LED driver circuitry, the microcontroller can make changes in the electrical power provided to the light-emitting diode in order to maintain an appropriate power dissipation in the light-emitting diode.

The circuit illustrated in FIG. 1 does not require a separate temperature sensor. The circuit can be described as converting current to time; the lower the current, the longer the time it takes to charge the capacitor to a specified voltage level. The circuit can be utilized to sense changes in both light intensity and changes in temperature. The sensed changes in light intensity may be utilized in fiber optic data communication applications, or otherwise sensing physical processes that alter light intensity. The measurement of changes in temperature may be utilized for estimating ambient temperature. By using the same components for both functions, no additional components are required for temperature sensing. Thus, the circuit of the present invention reduces total circuit cost, circuit board area, circuit power consumption, and microcontroller resources.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A combination temperature sensor, comprising:
an electrical power source;
a photodiode connected to the electrical power source in reverse bias configuration;
a capacitor connected to the photodiode in a manner that causes leakage current from the photodiode to charge the capacitor to a voltage;
a controller configured to measure a length of time it takes for the voltage to change from a first predetermined value to a second predetermined value, such that the temperature can be determined based, at least in part, on the length of time.

2. The sensor of claim 1, wherein:
the controller is configured to reset the voltage to the first predetermined value after the voltage reaches the second predetermined value.

3. The sensor of claim 1, wherein:
the photodiode provides a dark leakage current; and
the controller is configured to measure the length of time when the photodiode is providing the dark leakage current.

* * * * *